United States Patent [19]

Malcolm et al.

[11] Patent Number: 5,781,540
[45] Date of Patent: Jul. 14, 1998

[54] DEVICE AND METHOD FOR COMMUNICATING IN A MOBILE SATELLITE SYSTEM

[75] Inventors: James Eryx Malcolm, Bethesda; Daniel Fraley, Germantown; Adrian Morris, Gaithersburg; David Roos, Boyds; Kumar Swaminathan; Seok Ho Kim, both of North Potomac; Robert Carroll Marquart, Germantown, all of Md.

[73] Assignee: Hughes Electronics, Los Angeles, Calif.

[21] Appl. No.: 497,582

[22] Filed: Jun. 30, 1995

[51] Int. Cl.$^6$ ................................................ H04B 7/212
[52] U.S. Cl. ........................... 370/321; 370/431; 370/442; 455/12.1; 455/54.1
[58] Field of Search ...................... 370/95.1, 95.3, 370/84, 79, 66, 17, 29, 110.4, 100.1, 50, 75, 32.1, 431, 442, 321, 465, 375, 252, 294, 527, 503, 315, 319, 324, 350, 509; 455/34.1, 13.1, 12.1, 13.2, 71, 33.1, 56.1, 34.2, 63, 69, 67.4, 54.1, 75; 379/61; 340/825.44

[56] References Cited

U.S. PATENT DOCUMENTS

| | | | |
|---|---|---|---|
| 5,299,198 | 3/1994 | Kay et al. | 370/95.3 |
| 5,369,637 | 11/1994 | Richardson et al. | 370/84 |
| 5,446,739 | 8/1995 | Nakano et al. | 370/95.3 |
| 5,528,585 | 6/1996 | Cooley et al. | 370/95.1 |
| 5,539,730 | 7/1996 | Dent | 370/50 |
| 5,550,831 | 8/1996 | Tanahashi | 370/95.3 |

OTHER PUBLICATIONS

Kelly, R.W., "Use of Low Earth Orbit Satellite Technology in the Development of a Unique Communications and Marine Positioning System." Proceedings of the Ion GPS-93, pp. 199–204, Jun. 1993.

*Primary Examiner*—Melvin Marcelo
*Assistant Examiner*—Melissa Kay Carman
*Attorney, Agent, or Firm*—John Whelan; Wanda Denson-Low

[57] ABSTRACT

The present invention relates to a device and a method for communicating in a mobile communication system. The method provides a carrier signal having a plurality of frames. Each frame has a plurality of time slots, and each time slot comprises a plurality of transmission bits. A group of time slots are assigned to a communication channel. A traffic burst signal having a plurality of traffic symbols is transmitted over the communication channel by transmitting a first preamble over one of the assigned time slots, and transmitting a second preamble and at least one of the traffic symbols over at least one of the other assigned time slots. The second preamble occupies fewer transmission bits than the first preamble. The apparatus for transmitting a telephony signal over an RF channel includes a modem receiving a digitized PCM telephony signal and producing a traffic burst signal, and a transmitting unit in communication with the modem for transmitting a FDMA/TDMA signal carrying a plurality of traffic burst signals. At least one of the traffic burst signals carries a limited preamble message including a header field and a unique word field and at least one digitized voice message associated with a telephone call. Another traffic burst signal carries at least one signal acquisition message including a unique word field.

21 Claims, 6 Drawing Sheets

DEVICE AND METHOD FOR COMMUNICATING IN A MOBILE SATELLITE SYSTEM

BACKGROUND OF THE INVENTION

Conventional mobile satellite communication systems include a mobile unit or a gateway that has a burst modem for transmitting traffic burst signals over a communication channel. The burst modem typically sends a preamble along with each traffic burst, and the preamble usually includes a header field and a unique word field. In either the mobile unit or the gateway, a receiver measures the frequency offset of the transmitted preamble in order to detect the traffic burst signal. In addition, the receiver usually derives the timing offset and the carrier phase offset of the traffic burst signal from the unique word field.

When transmitting the traffic burst signal, sending the preamble adds to the communication system's overhead by consuming valuable transmission time and frequency bandwidth resources. For example, the time spent sending the preamble over the communication channel could be used to transmit other information, such as telephony data. Since these conventional systems require a rather large amount of time allocated to send the preamble, less information may be transmitted over the communication system at any given period of time.

Accordingly, there is a need for a device and method that can transmit more information over a communication channel in a mobile satellite communication system during a given interval of time, thereby increasing transmission efficiency.

SUMMARY OF THE INVENTION

The present invention relates to a method and device for communicating in a mobile communication system. The preferred method provides a carrier signal having a plurality of frames. Each frame has a plurality of time slots, and each time slot comprises a plurality of transmission bits. First and second time slots are assigned to a communication channel. A traffic burst signal having a plurality of traffic symbols is transmitted over the communication channel by transmitting a first preamble over a first time slot, and transmitting a second preamble and at least one of the traffic symbols over at least one of the second time slots. Preferably, the second preamble occupies fewer transmission bits than the first preamble.

Preferably, the method also includes the steps of receiving the traffic burst signal by detecting the first preamble from the communication channel, synchronizing to the second time slot in the communication channel, detecting the second preamble, and detecting at least one of the traffic symbols.

Another aspect of the present invention provides a method of locking onto a carrier signal in a mobile terminal of a mobile satellite telephony system. The method includes the steps of receiving an assigned frequency and time slot from data within a forward control channel, tuning to the assigned frequency, receiving a full preamble comprising signal acquisition data from the assigned time slot over a first time interval, and storing at least some of the signal acquisition data. The method also includes the steps of retrieving the stored acquisition data, and receiving a limited preamble and traffic data from the time slot over a second time interval.

The device according to a preferred embodiment includes an apparatus for transmitting a telephony signal over an RF channel. The apparatus includes a modem and a transmitting unit. The modem receives a digitized pulse code modulation (PCM) telephony signal and produces a plurality of traffic burst signals. The transmitting unit is in communication with the modem and transmits a FDMA/TDMA signal carrying the traffic burst signals. At least one of the traffic burst signals includes a limited preamble message and at least one traffic symbol.

Another traffic burst message includes a signal acquisition message such as a full preamble message. Preferably, the modem may be incorporated into a mobile terminal or a gateway earth station in a mobile communication system.

Another preferred embodiment relates to a satellite in a mobile satellite communication system. The satellite transmits and receives a plurality of spot beams, and each spot beam is divided into a plurality of frequency bands. Each frequency band has at least one carrier, and each carrier is divided into a plurality of frames. Each frame is divided into a plurality of time slots and each time slot has a plurality of transmission bits.

The communication channel comprises a group of time slots where at least one of the time slots in the group carries a first preamble, and another time slot in the group carries a second preamble. The first preamble occupies more transmission bits than the second preamble.

Another preferred embodiment of the present invention relates to a method of transmitting in a mobile communication system an RF-signal carrying variable size time slots. This method includes the step of providing a carrier signal having a plurality of frames. Each frame has a plurality of time slots, and each time slot comprises two or more adjacent subslots, each subslot having a plurality of transmission bits. At least some of the time slots are assigned to a communication channel, and a traffic burst signal having a plurality of traffic symbols is transmitted over the communication channel.

Another preferred embodiment is an apparatus for transmitting a telephony signal over an RF channel partitioned into variable length time slots. The apparatus includes a modem and a transmitting unit in communication with the modem. The modem receives a digitized PCM telephony signal and produces a plurality of traffic burst signals. The transmitting unit transmits the traffic burst signals over a carrier signal having a plurality of time slots. Each of the time slots comprises at least two adjacent subslots.

The preferred embodiment of the present invention can conserve bandwidth and improve the throughput of transmissions in a mobile satellite system. The invention, together with further objects and attendant advantages, will best be understood by reference to the following detailed description, taken in conjunction with the accompanying drawings.

DETAILED DESCRIPTION OF THE DRAWINGS

Figure 1:
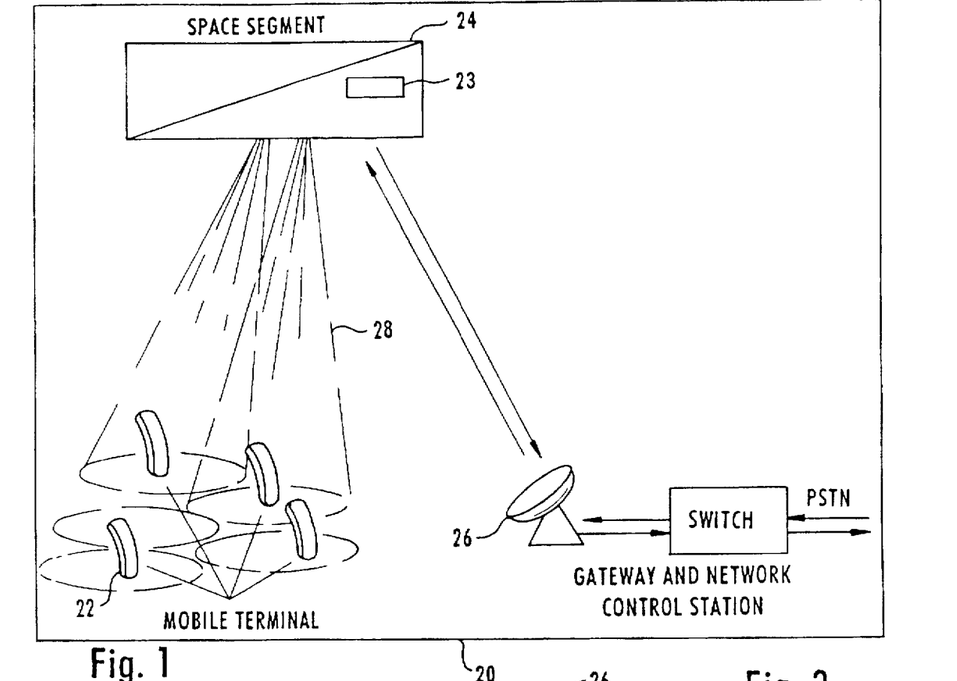
FIG. 1 is a block diagram of a preferred embodiment of a mobile satellite communication system.

Referring now to the drawings, and more particularly to FIG. 1, a preferred embodiment of a mobile satellite communication system 20 is illustrated. The mobile communication system 20 includes at least one mobile terminal 22, at least one space segment 24 such as a satellite, and at least one gateway earth station 26. The mobile terminal 22 is typically either a handheld phone or a vehicle mounted unit. The mobile terminal 22 communicates over an L-band frequency within a particular spot beam 28 with the space segment 24. Each spot beam 28 is associated with a predetermined geographic region.

The gateway 26 communicates with the space segment 24 over a Ku-band frequency. The space segment 24 includes transponders 23 for translating between L-band spot beam signals used by the mobile terminals 22 and the Ku-Band signals used by the gateways 26. The gateway 26-interfaces with a terrestrial telephony carrier, such as the public switched telephone network (PSTN), and may also interface with a cellular network. Thus, a user may place a call on the mobile terminal 22 to either a land line user over the PSTN or to a cellular phone user over the cellular network.

The space segment 24 provides L-band-to-L-band bent pipe single hop communication to support mobile to mobile communication. At the space segment 24, the L-band uplink and downlink are transmitted via multiple spot beams. In the preferred embodiment, small spot size within each spot beam 28 provides the link margins to operate with low power remote terminals 22. In addition, the preferred embodiment provides for frequency reuse so that many, preferably about 16,000, users may be served using a minimum of L-band spectrum. Preferably, the bandwidth of each spot beam 28 can be varied to accommodate changing traffic patterns.

Subscribers to the system have a unique telephone number that allows them to receive calls when they are registered in a space segment 24 coverage area.

Registration is automatic when the mobile terminal 22 is turned on. A registration procedure locates the mobile 22 within a particular spot beam 28 coverage area.

In addition to originating calls, the mobile terminal 22 can receive calls from any terrestrial facility by connecting the call through one of the gateway stations 26. At this point, the gateway 26 determines the location of the mobile 22 and sends a message to the mobile terminal 22 to announce the incoming call.

The system 20 utilizes low rate encoded voice transmission. Preferably, some of the mobiles 22 are dual mode, allowing voice communications either via satellite or via the local cellular system. The gateway earth station 26 provides for user mobility as the user's mobile terminal 22 moves from spot beam 28 to spot beam 28.

In addition to the communication channels carried by the space segment 24, some of the space segment resources are used for control functions. In the preferred embodiment, one or more channel in each spot beam 28 are control channels. For example, the gateway station 26 places a forward control signal in each spot beam 28 to allow synchronization of the mobile terminals 22 and to carry network control information from the gateway station 26 to the mobile terminals 22.

The forward control channels allow mobile terminals 22 to acquire a satellite carrier and identify the spot beam 28 and gateway station 26 that originates the signal. The gateway 26 uses the forward control channel to page mobiles 22 using their unique address to announce mobile terminated calls.

Each spot beam 28 preferably contains a return direction signaling channel that mobile terminals 22 use to initiate calls or to register with the gateway 26.

During a call, in-band low data rate control channels are preferably available between the mobile 22 and the gateway 26 for call supervision, power control, and to indicate call termination.

The system 20 contains considerable operational flexibility both from the standpoint of network features and mobile terminal capability. The ground segment facilities include and support features generally categorized as advanced intelligent network (AIN) functionality. In order to support the needs of a business traveler, the switches at the gateway earth stations 26 are configured to provide calling features such as call forwarding, call waiting, call screening, and advanced billing features. In addition, databases in communication with the switch can be configured to generate and maintain user databases to enhance network operation for the user and to facilitate mobility management. Storing and updating user agendas and itineraries are examples.

Figure 2:
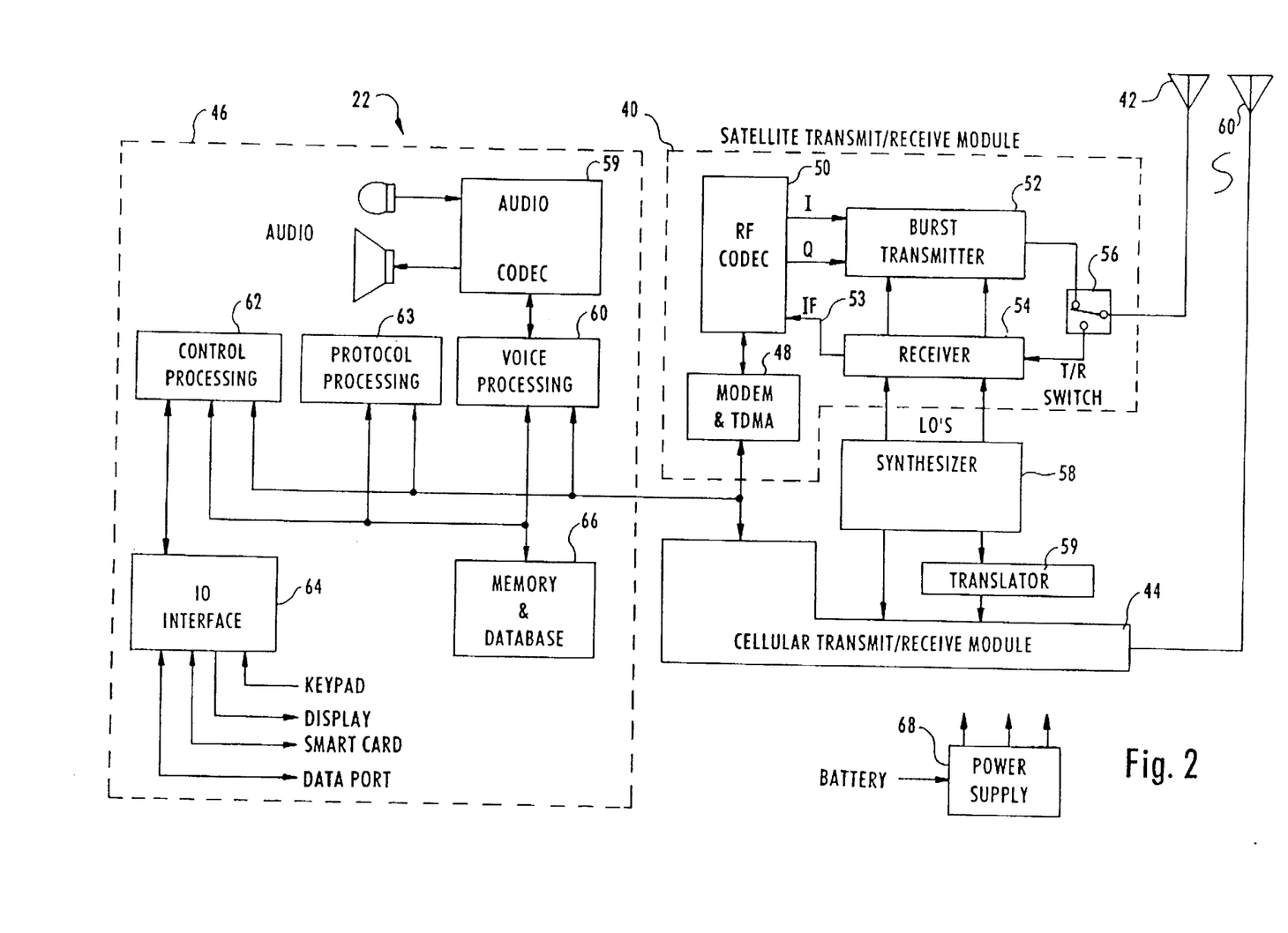
FIG. 2 is a block diagram of a preferred embodiment of a mobile terminal for use in the mobile satellite communication system of FIG. 1.

A preferred embodiment of a mobile terminal 22 is shown in FIG. 2. The mobile terminal 22 includes a satellite module 40, a first antenna 42, a cellular module 44, and a user interface module 46. The satellite module 40 is coupled to the user interface module 46, the cellular module 44, and to the first antenna 42. Preferably, the first antenna 42 is a small low power antenna. The satellite module 40 includes a modem and TDMA unit 48, an RF coder and decoder (codec) 50, a burst transmitter 52, a receiver 54, and a transmit or receive (T/R) switch 56. In the preferred embodiment, the modem 48 is connected to the RF codec 50, and the RF codec 50 is connected to the burst transmitter 52 and to the receiver 54. The T/R switch 56 is connected to the burst transmitter 52, the receiver 54, and the first antenna 42.

Within the satellite module 40, the modem 48 converts speech or data samples to and from channel symbols using quadrature phase shift key modulation (QPSK). The QPSK is preferably performed digitally by an application specific integrated circuit or alternatively a commercially available digital signal processor integrated circuit. The RF codec 50 converts channel symbols from the modem 48 into baseband I and Q signals that are transmitted to the burst transmitter 52. In the receive direction, the RF codec 50 processes an IF signal 53 from the receiver 54 for input to the modem 48. The RF codec is preferably an application specific integrated circuit or alternatively a commercially available digital signal processor integrated circuit.

The modem 48 and/or the RF codec 50 includes a routine for performing various signal processing operations. Specifically, the routine divides encoded signals into a plurality of traffic symbols to be transmitted to a satellite. It also frequency divides an IF signal into a plurality of carriers, time divides each carrier into a plurality of frames, and time divides each frame into a plurality of time slots, each time slot having a plurality of transmission bits. The routine further provides a communication channel by assigning a group of the time slots, each selected from a different frame. Still further, the routine produces a channelized signal by inserting a first preamble into one of the assigned time slots, and inserting a second preamble and at least one of the traffic symbols into at least one of the other assigned time slots, wherein the second preamble occupies fewer transmission bits than the first preamble.

The burst transmitter 52 converts the I and Q signals from the RF codec 50 up to a desired frequency, preferably an L-band frequency, for transmission by the first antenna 42. The burst transmitter 52 is preferably 35 a hybrid RF integrated circuit. The receiver 54 converts a received L-band signal from the first antenna 42 into the IF signal 53 sent to the RF codec 50. The receiver 54 is preferably a hybrid RF integrated circuit.

The T/R switch 56 allows the mobile terminal 22 to either transmit data or receive data. Since the preferred mobile terminal 22 does not generally transmit and receive simultaneously, the mobile terminal 22 does not need a large filter to isolate the transmission and reception paths. Many conventional mobile terminals require a diplexor or similar device to perform such filtering. However, conventional mobile terminals 22 with diplexors are more costly, weigh more, and add approximately one-half dB of undesirable insertion loss.

The mobile terminal 22 also includes a synthesizer 58 that provides a fixed local oscillator signal for the RF codec 50. The synthesizer 58 includes a variable local oscillator for channel tuning within the satellite module 40 and generates data clocks for the modem 48. In the preferred embodiment, the synthesizer 58 is connected to the receiver 54 as well as to the cellular module 44 directly and through a translator 59 as shown in FIG. 2.

The user interface module 46 includes an audio and codec unit 59, a voice processing unit 60, a controller 62, a protocol processing unit 65 an input/output (I/O) interface 64, and a memory 66. Preferably, each element within the user interface module 46 communicates with the other user interface elements.

The audio unit 59 digitizes an audio analog signal from a telephone handset (not shown) into a digital 64 Kilobit per second (Kb/s) pulse code modulation (PCM) signal. The audio unit 59 also converts digital PCM signals into an audio signal transmitted to the telephone handset (not shown).

The voice processing unit 60 includes a voice transcoder that performs source coding to compress the digital 64 Kb/s PCM signal. Specifically, an encoder running on a, programmable digital signal processor, such as a low delay CELP encoder, compresses the 64 Kb/s PCM signal into approximately a 3.6 Kb/s encoded signal. Alternatively, the encoder may be a multibased excited (MBE) type 3.6 Kb/s encoder that is well known to those skilled in the art. Both the CELP type and the MBE type encoder produce an output having a voice quality of at least 3.2 MOS. Of course, if an application allows a lower quality voice signal, such as in a military application, even lower rate encoding could be used.

The controller 62 preferably provides a multi-tasking firmware environment for monitoring and controlling the mobile terminal hardware. The controller 62 may occupy the same processor as the voice transcoder or may optionally be disposed on a separate processor. Preferably, the controller 62 includes an I/O interface 64 that provides a communication interface with a user. The I/O interface 64 includes a keypad for data entry such as a phone number, a display, a data port, for digital communication such as a facsimile transmission, and a smart card interface as specified in GSM.

The cellular module 44 allows the mobile terminal 22 to communicate with a cellular system over a second antenna 60. The cellular module 44 uses standard components, such as a GSM chip set, known to those skilled in the art. The mobile terminal 22 preferably operates in a first mode where the terminal 22 functions as a conventional cellular phone. In a second mode, the mobile terminal 22 preferably operates so that the mobil terminal 22 communicates with the satellite 24. A battery 68 is provided for portable operation of the mobile terminal 22.

The preferred mobile terminal 22 has many advantages. For example, the mobile terminal 22 provides dual-mode operation, either cellular or satellite. Also, the mobile terminal 22 provides high quality digital voice with a measured MOS score from about 3.2 to 4.0. Further, the mobile terminal 22 allows for paging and messaging, transmission at a 2400 or 4800 bps data rate via the data port, and provides a convenient cellular-like interface. Also, the mobile terminal 22 may transmit on a single channel using a single time slot within a carrier signal allowing many other mobile terminals 22 to transmit over the same carrier. Thus, the mobile terminal 22 efficiently transmits over scarce L-band frequency resources.

Figure 3:
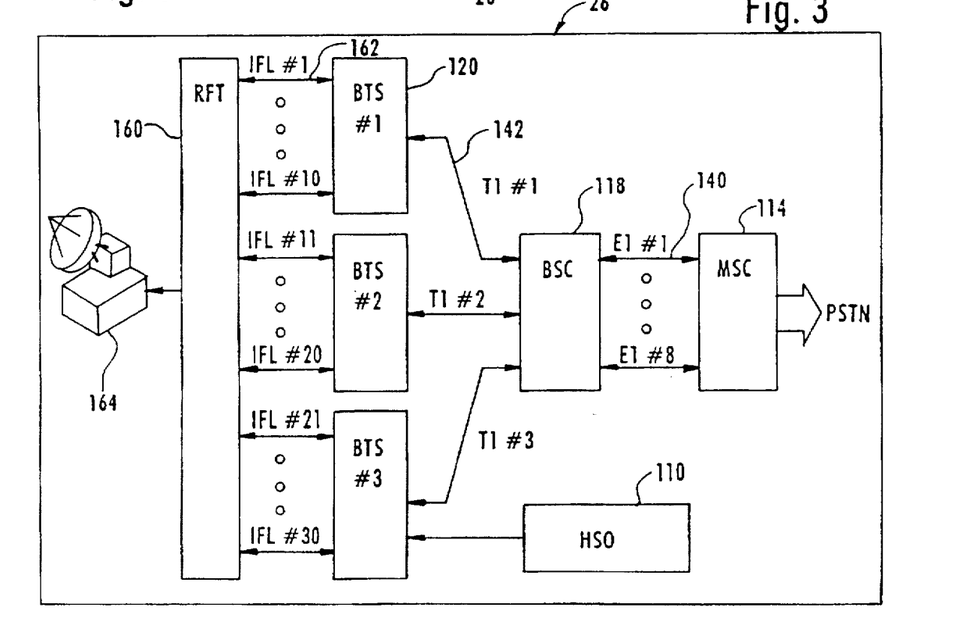
FIG. 3 is a block diagram of a preferred embodiment of a gateway earth station for use in the mobile satellite communication system of FIG. 1.

FIG. 3 is a block diagram of a preferred embodiment of a gateway 26. The gateway 26 includes a mobile switching center (MSC) 114, a plurality of base station controllers (BSC) 118, a plurality of base transceiver stations (BTS) 120, and a radio frequency unit 160 which is coupled with an antenna 164 as described in more detail hereinafter in connection with FIG. 6. The MSC 114 allows communication with the public switched telephone network (PSTN) and other mobile switching centers. The MSC 114 is connected, preferably by an A-interface 140 such as a standard E1 or E3 line, with at least one BSC 118. The BSC 118 is connected through a communication channel 142, such as a T1 line, to one or more of the base transceiver stations (BTS) 120. Each BTS 120 may communicate over an RF frequency with a mobile terminal 22.

A telephone "call" may be originated from the mobile terminal 22 by transmitting initialization data up to the space segment 24 over a control channel and then down to the gateway 26. In the preferred embodiment, the control channel is transmitted over a time slot within a frequency assigned to a spot beam 28 having a coverage area surrounding the mobile terminal 22. At the gateway 26, the call is transmitted via an RF channel in the radio frequency unit 160 to the BTS 120 assigned to the spot beam 28 servicing the mobile terminal 22. From the BTS 120, the call is routed to the BSC 118, and then to the MSC 114. From the MSC 114, the call is routed to either the PSTN or another MSC. Thereafter, a communication channel is established through the entire gateway 26, and a subscriber using the mobile terminal 22 may communicate over the established communication channel.

Calls may also originate from either the PSTN or another MSC. Such a call enters the gateway 26 at the MSC 114 and is routed to one of the BSCs 118. The BSC 118 then pages the mobile subscriber 22 via the appropriate BTS 120. After the mobile subscriber 22 responds to the page from the BTS 120, a communication channel is established.

Figure 4:
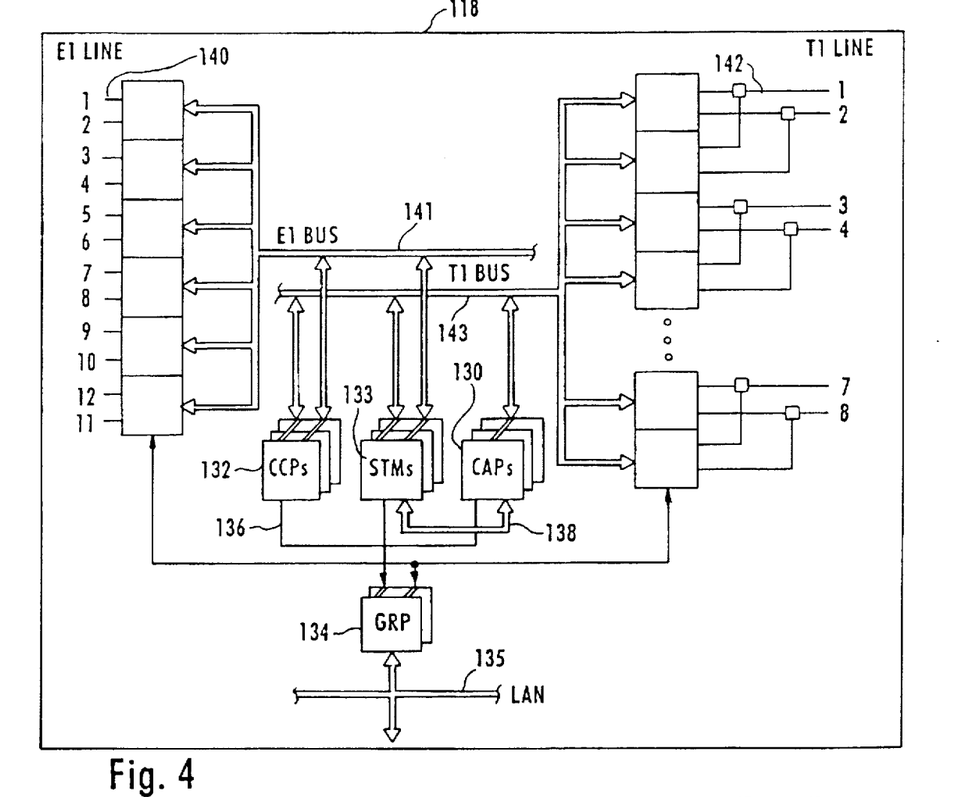
FIG. 4 is a block diagram of a preferred base station controller within the gateway earth station of FIG. 3.

FIG. 4 illustrates a preferred component layout for the BSC 118. The BSC 118 communicates with the MSC 114 over E1 transmission lines 140 (which transmit data to and from an E1 bus 141) and communicates with the BTS 120 over T1 transmission lines 142 (which transmit data to and from a T1 bus 143). The BSC 118 has several processors including a call control processor (CCP) 132, a global resource processor (GRP) 134, a switching transcoder module (STM) 133 and a channel access processor (CAP) 130. As shown in FIG. 4, the GRP 134 is conventionally connected to a LAN. The BSC 118 also includes a BSC local area network (LAN) 136 and a VME bus 138. The VME bus 138 is used to communicate between the various CAPs 130, while the LAN 136 allows communication between the CCPs 132.

Each processor, (130, 132, 133, and 134) shown in FIG. 4 is preferably a 32 bit microprocessor such as an Intel 960. The processors (130, 132, and 134) are preferably operated with a multitasking software operating system such as UNIX or, most preferably, the VX WORKS operating system available from Wind River Systems.

Each processor (130, 132, 133, and 134) is typically programmed with application software and communication software. Preferably, such software is written in C language or another conventional high level programming language. Each of the processors (130, 132, 133, and 134) communicates with the other processors using either the BSC LAN 136 or the VME bus 138. Preferably, the processors (130, 132, 133, and 134) communicate with each other using a network configuration and communication techniques well-known in the art.

Calls originating from the mobile subscriber 22 are received over the T1 line 142 and processed by the GRP 134. The GRP 134 then determines, based on loading conditions, which CCP 132 should handle the call. The call is then handed off to the selected CCP 132 assigned to the call. The CCP 132 then determines which CAP 130 should be used.

In the case of a call terminating to a mobile subscriber 22, the call originates from the MSC 114 over an E1 line 140 and is then routed to a GRP 134. The GRP 134 allocates a CCP 132, which then allocates a CAP 130.

Figure 5:
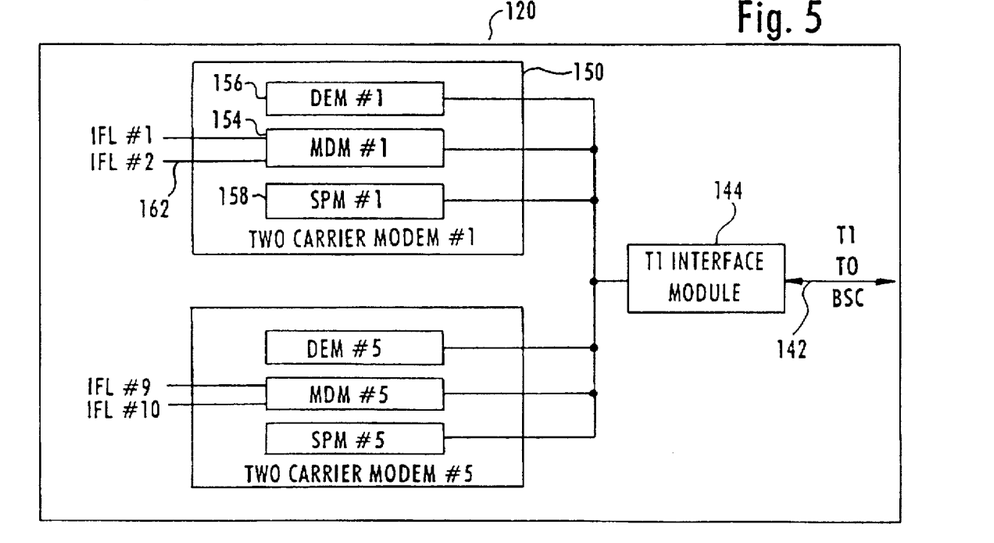
FIG. 5 is a block diagram of a preferred embodiment of a base transceiver station within the gateway earth station of FIG. 3.

FIG. 5 illustrates a block diagram of a preferred component layout for the BTS 120. The BTS 120 communicates with the BSC 118 over a T1 interface module 144 connected to the T1 communication lines 142. A two carrier modem 150 is connected to the T1 interface module 144 and receives data from the T1 lines 142. The two-carrier modem 150 generates an analog signal over the IFL 162 to communicate with the mobile subscriber 22.

Each two-carrier modem 150 includes a modulator down-converter (MDM) 154, a demodulator module (DEM) 156, and a slot processor module (SPM) 158. The modem 150 receives and synchronizes the data stream sent over the T1 line 142 from the BSC 118. Specifically, the modem 150 extracts and deframes voice traffic from the T1 data stream. The modem 150 also performs baseband processing and transmit filtering of a transmit packet formed from the data stream. The modem 150 modulates, upconverts, and amplifies the processed signals. Preferably, the modem 150 is implemented as an application specific integrated circuit.

Each BTS 120 contains a plurality of communication channels available for transmission. These channels may be control channels, traffic channels, or paging channels. The control channels are used to communicate between the BTS 120 and the mobile terminal 22 before the mobile terminal 22 has been assigned a voice channel for communication. The traffic channel may be used for voice communication between the BTS 120 and the mobile terminal 22. Each traffic channel is associated with a specific predefined frequency and a specific time slot used for radio transmission by an antenna 164 via the radio frequency unit 160 to which the BTS 120 of FIG. 5 is connected, as shown in FIG. 3. In a preferred FDMA/TDMA embodiment, each frequency contains a frame supporting eight time slots where each time slot is associated with a transmission channel.

Figure 6:
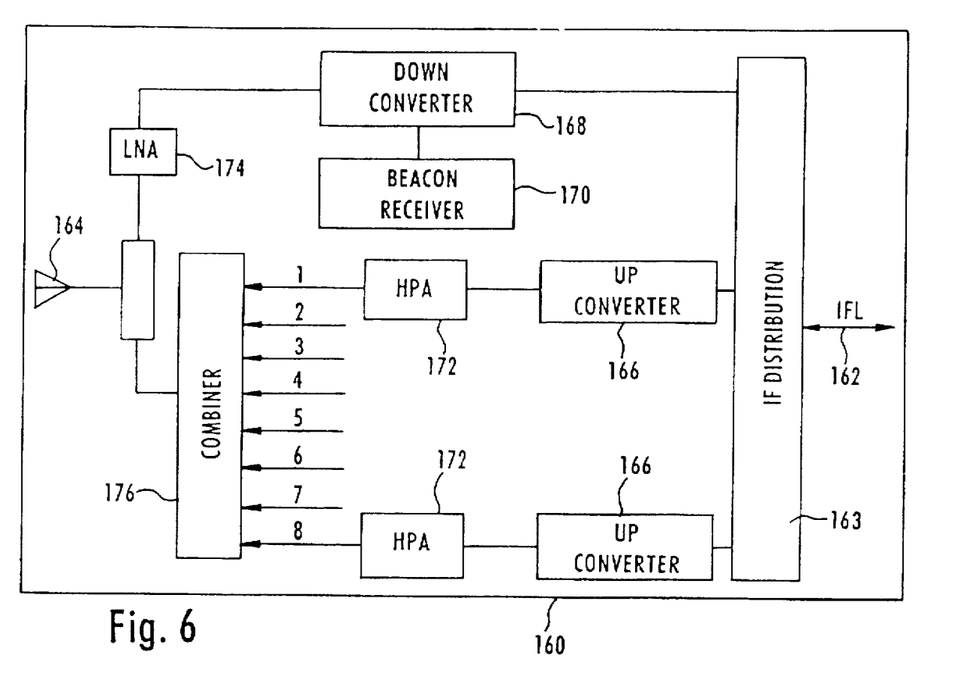
FIG. 6 is a block diagram of a preferred embodiment of a radio equipment component of the gateway earth station of FIG. 3.

Referring to FIG. 6, a preferred embodiment of the RFT module 160 is shown. The RFT module 160 communicates with the BTS 120 via a plurality of interfacility links (IFL) 162 and communicates with the space segment 24 via an antenna 164. The RFT module 160 preferably includes the upconverter 166, a downconverter 168, a receiver 170 such as a beacon receiver, a high power amplifier (HPA) 172, a low noise amplifier (LNA) 174, and a combiner 176. In the preferred embodiment, the HPA 172 is connected to the upconverter 166 at its input and is connected to the combiner 176 at its output. The LNA 174 is connected to the combiner at its input and is connected to the downconverter 168 at its output. The downconverter is preferably connected to the receiver 170 and the combiner 176 is preferably coupled to the antenna 164.

The upconverter 166 receives a signal from the IFL 162 via an IF distribution unit 163 and converts the frequency of the received signal up to a desired transmission frequency. The HPA 172 amplifies the desired frequency signal produced by the upconverter 166 and transmits the amplified signal to the combiner 176. The combiner 176 multiplexes a plurality of amplified signals into an RF output signal to be transmitted over the antenna 164.

After receiving a signal from the antenna 164, the signal is amplified by the LNA 174, downconverted to an intermediate frequency (IF) signal by the downconverter 168, and detected by the receiver 170. The IF signal is then sent over an IFL 162 again via the IF distribution unit 163 to the BTS 120 (FIG 3).

The satellite 24 provides congruent beams for transmission and reception. In a preferred embodiment, a first satellite 24 has a coverage region over the continent of Africa and a second satellite covers Asia. Each spot beam 28 covers a predetermined geographic area on the earth's surface. Also, each spot beam 28 includes a predetermined group of frequencies according to a designed frequency reuse plan. In the preferred embodiment, the system uses a seven cell repeating frequency reuse pattern. Thus, the available bandwidth, 10 Mhz for L-band, is divided by seven, so that each spot beam has about 1.43 Mhz of available bandwidth. In the preferred embodiment, a bandwidth of 31 KHz is allocated to each carrier, and eight channels are assigned to each carrier yielding about 258 channel per Mhz or a maximum of about 368 channels per spot beam 28.

Figure 7:
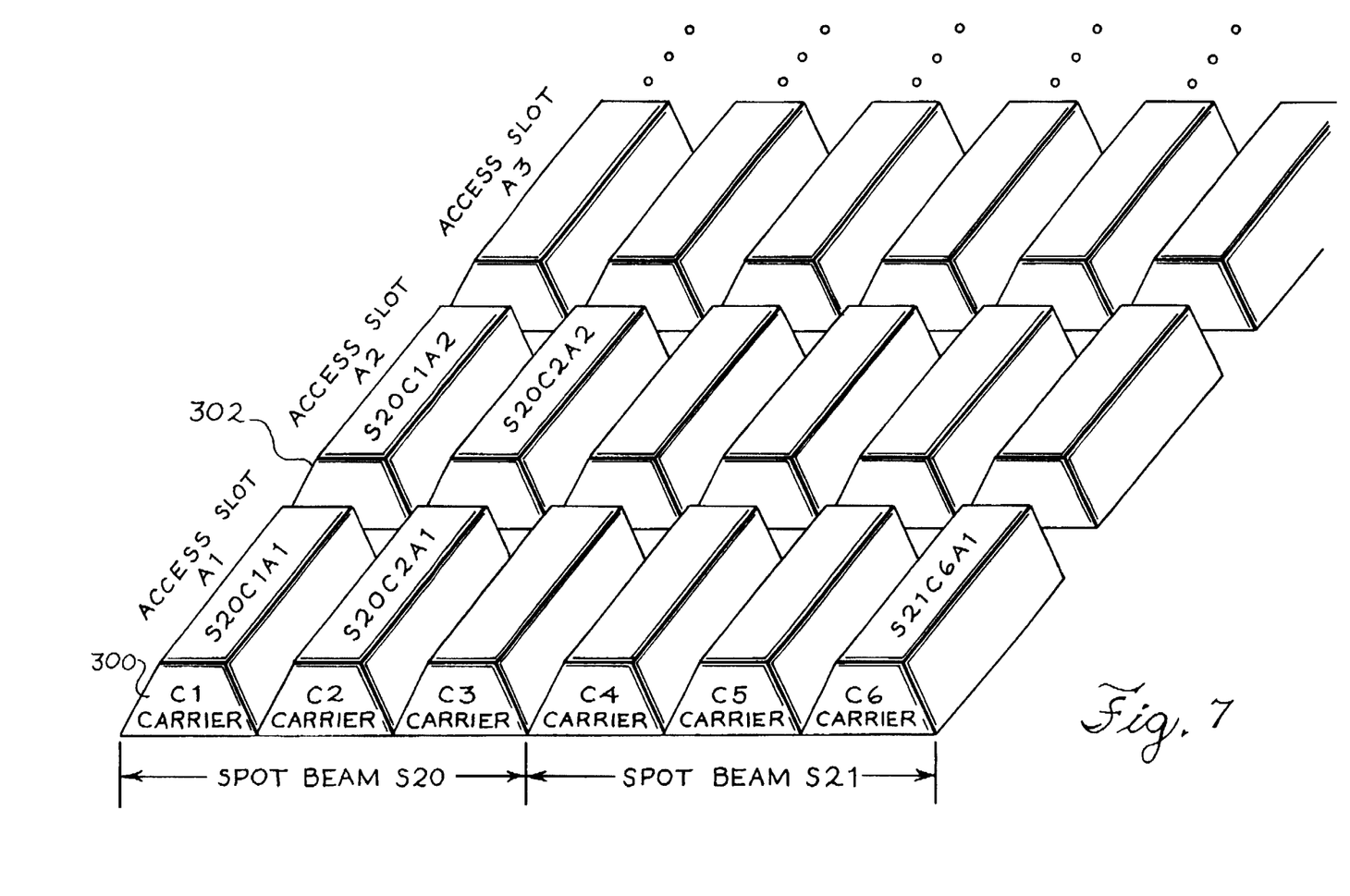
FIG. 7 is a diagram of a preferred embodiment of a frequency reuse plan in the mobile satellite communication system of FIG. 1.

As shown in FIG. 7, each spot beam includes at least one carrier signal 300. Each carrier signal 300 is transmitted over a different frequency, preferably an L-band frequency. Also, each carrier 300 within each spot beam 28 carries a plurality of access slots 302 such as time slots. Thus, a unique communication channel between a mobile terminal 22 and the satellite 24 may be identified by a spot beam number, a carrier number, and a time slot number.

Figure 8:
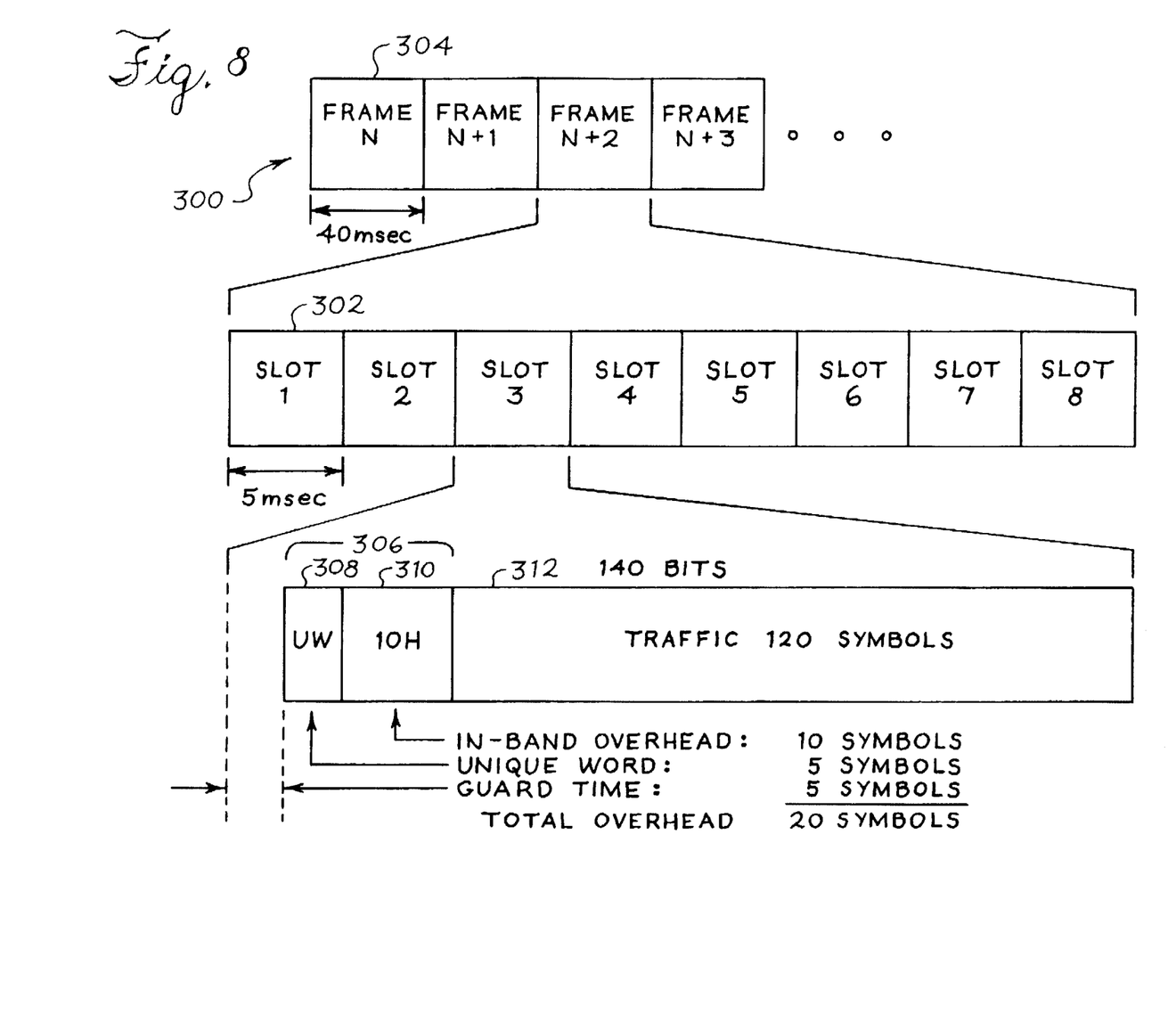
FIG. 8 is a diagram of a preferred embodiment of time slots within a carrier signal transmitted over the mobile satellite communication system of FIG. 1.

Referring to FIG. 8, a preferred embodiment of a carrier signal 300 is divided into a plurality of frames 304. Each frame 304 has a preferred duration of 40 ms. In one preferred embodiment, each frame 304 carries eight time slots 302 and each time slot 302 has a duration of 5 ms.

In an alternative preferred embodiment, each frame 304 is divided into a plurality of thirty two subslots, each subslot having a duration of 1.25 ms. In this embodiment, each time slot 302 is formed from two or more adjacent subslots. Allowing each time slot to have a variable duration increases the flexibility of the system 20. For example, since data transmissions typically have longer burst lengths than voice transmissions, it would be desirable to provide longer time slots for data calls than for voice calls. Also, a time slot with a shorter duration will be required in the future to carry lower rate encoded data having shorter bursts. Thus, a time slot having a plurality of subslots provides flexibility for the current system and compatibility for the future.

As shown in FIG. 8, each time slot 302 includes a number of transmission bits. In the preferred embodiment, a time slot 302 having a 5 ms duration can carry 140 transmission bits. Each time slot 302 may carry a limited preamble 306. The limited preamble 306 preferably includes a unique word field 308 of five bits, and an inband overhead field 310 of ten bits. Each time slot 302 also carries at least one and preferably 120 traffic symbols 312. Also, other combinations of frame length, subslot number and subslot length are possible.

Figure 9:
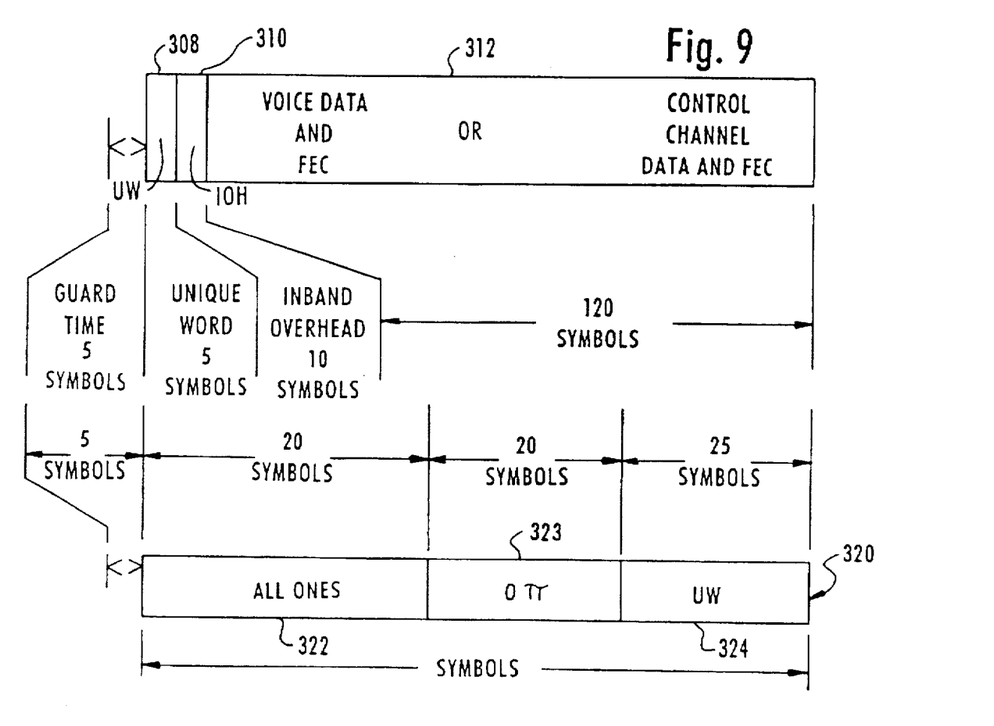
FIG. 9 is a diagram illustrating a preferred limited preamble and a preferred full preamble for use with the time slots of FIG. 8.

As shown in FIG. 9, the traffic symbols 312 typically include forward error correction data and either voice data or control channel data. In addition, each time slot 302 may carry a full preamble 320. The full preamble 320 includes a header field 322, typically comprising a plurality of logic one bits, a recognizable symbol 323 such as zero-pi, and a unique word carrier signal 300 and estimate its parameters such a field 324. The header field 322 is typically used to detect the carrier frequency offset, carrier phase, carrier level and the symbol timing phase error. The preamble unique word 324 is used to resolve any phase ambiguities and to mark the beginning of the user data portion of the burst comprising traffic signal 312.

In the preferred embodiment, the full preamble header field 322 includes twenty bits of logical ones and twenty bits of zero-pi, and the unique word field 324 occupies twenty five bits. The unique word field 324 in the full preamble contains more bits than the unique word field 308 in the limited preamble 306. Although the preferred embodiment refers to a specific number of bits present in each preamble, the present invention is not limited by the exact number of bits occupied by any of the fields in the limited preamble 306 or in the full preamble 320. For example, in an alternative embodiment, information normally transmitted in the inband overhead field 310 may instead be incorporated into the unique word field 308 to even further reduce preamble overhead. Also, a system designer may vary the ratio of the number of bits for the logic-one pattern to the number of bits for the zero-pi pattern based on typical system design tradeoffs and based on the particular communication application.

A preferred method of transmitting telephony data in the mobile communication system 20 is now described. A transmitting unit, such as the satellite 24, gateway 26 or the mobile terminal 22, in the mobile communication system provides a carrier signal 300 having a plurality of frames 304. Each frame 304 has a plurality of time slots 302, and each time slot 302 includes a plurality of transmission bits. A group of the time slots 302 selected from different frames of 304 is assigned to a communication channel. A traffic burst signal having a plurality of traffic symbols 312 is transmitted over the communication channel by transmitting a first preamble over one of the assigned time slots 302, and transmitting a second preamble and at least one of the traffic symbols 312 over at least one of the other assigned time slots 302. The second preamble is preferably a limited preamble 306 occupying fewer transmission bits than the first preamble which is preferably a full preamble 320.

Preferably, a receiving element, such as in a mobile terminal 22, gateway 26, or satellite 24, receives the traffic burst signal. The receiver detects the first preamble from the communication channel. The receiver then stores signal acquisition data, such as the frequency offset and timing offset data recovered from detecting the first preamble. The receiver then synchronizes to at least one of the other assigned time slots 302 by recovering the phase and retrieving the previously stored signal acquisition data. The receiver then detects the second preamble from the communication channel. Finally, the receiver detects at least one of the traffic symbols 312. Preferably, the receiver detects all subsequent traffic symbols received from the communication channel using the stored signal acquisition data so that the limited preamble 306 may be uses for synchronization instead of the full preamble 320. When there are no messages to transmit to the receiver, such as during a pause in a speech conversation, a short message containing only a unique word field 308 and the inband overhead field 310 may be transmitted to the receiver to maintain synchronization with the communication channel.

By only transmitting the full preamble 320 at the beginning of the call to allow the receiver to synchronize to the communication channel and thereafter transmitting the limited preamble 306, the mobile communication system 20 may communicate telephony data or other information more efficiently. For example, if a telephone call normally requires one thousand traffic bursts, the conventional approach would require transmission of one thousand full preamble 320 messages. Assuming that each full preamble 320 is sixty-five bits, then sixty-five Kilobits of overhead is transmitted for the call. However, if only one full preamble 320 is transmitted and thereafter limited preamble 306 messages are used, only about fifteen Kilobits of overhead is required.

Of course, there are many other possible combinations for the number of full preambles 320 and the number of limited preambles 306 in a given call. For example, a receiver may need to resynchronize to the communication channel during periods of transmission inactivity. In order to resynchronize the channel, the transmitter may need to send another full preamble 320. In this example, a phone call may send more than one full preamble 320 as well as a number of limited preamble 306 messages. Nevertheless, by sending the limited preamble 306 instead of the full preamble 320 whenever possible, the overhead involved in the call may be substantially reduced. The mobile terminal 22 transmits telephony data to a satellite 24 and receives data from the satellite 24 using this limited preamble method. Also, the gateway 26 transmits telephony data and control data to the mobile terminal 22 via the satellite 24. Once again, the gateway 26 utilizes the limited preamble method to conserve bandwidth and other transmission resources when communicating with the mobile terminal 22. For example, the gateway may send a full preamble 320 on the forward control channel so that a mobile terminal 22 may synchronize to the carrier. However, after the mobil terminal 22 sends a message to the gateway 26, the gateway 26 may then begin sending limited preamble 306 messages. Also, the gateway 26 or the mobile 22 may send any combination of limited preamble 306 and full preamble 320 messages on the traffic channel or the access channel.

Of course, it should be understood that a wide range of changes and modifications can be made to the preferred embodiment described above. It is therefore intended that the foregoing detailed description be regarded as illustrative rather than limiting and that it be understood that it is the following claims, including all equivalents, which are intended to define the scope of this invention.

What is claimed is:

1. A method of communicating in a mobile satellite system comprising the steps of:
providing for a transmitting unit a carrier signal having a plurality of frames, each frame having a plurality of time slots, each time slot comprising a plurality of transmission bits;
assigning a first and a second time slot from said plurality of time slots to a communication channel, each of said first and second time slots selected from a different frame; and
transmitting a traffic burst signal having a plurality of traffic symbols over said communication channel from said transmitting unit by:
transmitting a first preamble over the first assigned time slot; and
transmitting a second preamble and at least one of said traffic symbols over the second assigned time slot, said second preamble occupying fewer transmission bits than said first preamble.

2. The method of claim 1, further comprising the step of receiving said traffic burst signal from said transmitting unit by:
detecting in a receiving unit said first preamble from said communication channel over the first assigned time slot;
synchronizing the receiving element to the second assigned time slot in said communication channel;
detecting said second preamble from said communication channel; and
detecting at least one of said traffic symbols.

3. The method of claim 1, wherein said traffic burst signal comprises encoded telephony data.

4. The method of claim 1, wherein said first preamble comprises a field to enable acquisition of a carrier signal.

5. The method of claim 1, wherein said second preamble comprises a field to maintain synchronization with a carrier signal.

6. The method of claim 1, wherein said traffic symbol comprises control channel data and forward error correction data.

7. The method of claim 1, wherein each of said frames has a fixed interval with a duration of about 40 ms.

8. The method of claim 1, further including the steps of frequency modulating a telephony signal to produce a frequency modulated telephony signal; and transforming the frequency modulated telephony signal into the traffic burst signal.

9. The method of claim 1, wherein said carrier signal is transmitted over a frequency band of an RF signal.

10. A method of locking onto a carrier signal in a mobile satellite telephony system comprising the steps of:
receiving an assigned frequency and an assigned time slot from data transmitted by a forward control channel;
tuning a receiving element to said assigned frequency;
receiving a first preamble comprising signal acquisition data from said assigned time slot over a first time interval;
storing at least some of said signal acquisition data in the receiving element;
retrieving said stored acquisition data; synchronizing receive element to said time slot using said retrieved acquisition data; and
detecting a second preamble and traffic data from said time slot at a second time interval.

11. A method of transmitting traffic data in a mobile satellite TDMA communication system comprising the steps of:
transmitting from a transmitting unit signal acquisition data comprising a first preamble of a first number of bits over a time slot using an assigned frequency at a first time interval; and
transmitting from a transmitting unit a second preamble of a second number of bits less than the first number of bits and traffic data over said time slot using the assigned frequency at a second interval of time.

12. An apparatus for transmitting a telephony signal over an RF channel comprising:
a modem receiving a digitized PCM telephony signal and producing a plurality of traffic burst signals;
a transmitting unit in communication with said modem for transmitting a FDMA/TDMA signal carrying the traffic burst signals; and
at least one of said traffic burst signals comprising a first preamble message and at least one traffic symbol, and another of said traffic burst signals carrying at least one signal acquisition message comprising a second preamble;
wherein said first preamble includes a first number of bits and said second preamble includes a second number of bits greater than the first number.

13. The apparatus of claim 12, wherein said modem is incorporated into a mobile terminal of a mobile satellite communication system.

14. The apparatus of claim 13, wherein said mobile terminal comprises:
an audio interface module for converting an analog voice signal to a digital pulse code modulation (PCM) signal;
a digital processor including a voice transcoder for comprising the digital PCM signal into an encoded signal;
at least one modem coupled to the voice transcoder for modulating the encoded signal into a channelized signal;
said modem including a digital processor having a memory and including a routine for performing the following operations:
dividing the encoded signal into a plurality of traffic symbols to be transmitted to a satellite;
frequency dividing an IF signal into a plurality of carriers;
time dividing each of the carriers into a plurality of frames;
time dividing each frame into a plurality of time slots, each time slot having a plurality of transmission bits;
providing a communication channel by assigning a group of said time slots, each of said assigned time slots selected from a different frame; and
producing a channelized signal by inserting a first preamble into one of the assigned time slots, and inserting a second preamble and at least one of said traffic symbols into at least one of the other assigned time slots, said second preamble occupying fewer transmission bits than said first preamble;
an RF codec receiving the channelized signal and producing an RF signal;
a burst transmitter receiving the RF signal and frequency translating the RF signal up to a desired transmit frequency producing a traffic burst signal; and an antenna for transmitting the traffic burst signal over the air.

15. The mobile terminal of claim 14, further comprising a switch coupled to the burst transmitter and coupled to the antenna, said switch electrically connecting the antenna and the burst transmitter when the mobile terminal is transmitting a signal and disconnecting the antenna from the burst transmitter when the mobile terminal is receiving a transmitted signal.

16. The mobile terminal of claim 15, further comprising a second antenna;
   a cellular transmission and reception module coupled to the analog interface and the second antenna, said cellular module receiving a digital telephony signal from the analog interface and modulating the telephony signal up to a cellular band RF signal to be transmitted by the second antenna to a cellular base transceiver station; and
   an I/O interface allowing a user to select between a first operating mode where the mobile terminal transmits over the first antenna to the satellite and a second operating mode where the mobile terminal transmits over the second antenna to the cellular base transceiver station.

17. The apparatus of claim 12, wherein said modem is incorporated into a gateway earth station of a mobile satellite communication system.

18. The apparatus of claim 17, wherein said gateway earth station comprises:
   a mobile switching center (MSC) receiving at least one digitized telephony signal from a terrestrial carrier and generating at least one A-interface signal;
   a base station controller (BSC) coupled to said MSC receiving said A-interface signal, said BSC including at least an encoder for compressing said A-interface signal into an encoded low-rate signal;
   a base transceiver station (BTS) coupled to said BSC, said BTS including at least one modem, said modem translating said encoded low-rate signal into an intermediate frequency (IF) signal, said IF signal including at least one carrier, said carrier having a plurality of frames, each frame having a plurality of time slots, at least one of said time slots carrying a limited preamble and a traffic symbol derived from the encoded low-rate signal;
   a radio frequency component coupled to said BTS including an upconverter receiving said IF signal and generating an RF signal having a selected frequency mapped to an assigned satellite-to-mobile channel within an assigned spot beam, and a high power amplifier receiving said RF signal and generating an amplified RF signal; and
   an antenna receiving said amplified RF signal via a feeder and transmitting said RF signal to a satellite.

19. The gateway earth station of claim 19, wherein said satellite to mobile channel may be identified by a spot beam, carrier, and time slot number.

20. A mobile satellite telephony system comprising:
   a satellite for transmitting an RF signal; and
   a mobile terminal including a modem, said modem receiving the RF signal, said RF signal having a plurality of frequencies;
      wherein at least one of said frequencies carries a plurality of time slots, one of which carries a first preamble comprising a first number of bits and also carries a traffic symbol derived from a digitized telephony signal; and
      wherein another of said frequencies carries a plurality of time slots, one of which carries a second preamble comprising a second number of bits greater than the first number of bits.

21. A method of communicating in a mobile satellite system comprising the steps of:
   providing a carrier signal having a plurality of frames, each frame having a plurality of time slots;
   assigning at least some of said time slots to a communication channel, each of said assigned time slots selected from a different frame; and
   transmitting a traffic burst signal having a plurality of traffic symbols over said communication channel, wherein at least one of said time slots contains a different number of transmission bits than another of said time slots.

* * * * *